UNITED STATES PATENT OFFICE.

SYDNEY B. LEONARDY, OF TAMPA, FLORIDA.

OINTMENT.

SPECIFICATION forming part of Letters Patent No. 271,341, dated January 30, 1883.

Application filed May 31, 1882. (No specimens.)

*To all whom it may concern:*

Be it known that I, SYDNEY B. LEONARDY, a citizen of the United States, residing at Tampa, in the county of Hillsborough and State of Florida, have invented a new and useful composition of matter to be used for the cure of tetter, ringworm, and other cutaneous diseases, of which the following is a specification.

My composition consists of the following ingredients, combined in the proportions stated, viz: permanganate potassium, five grains; thymol,(crystallized,) ten grains; chrysophanic acid, thirty grains; cosmoline, one-half ounce; water, one dram. These ingredients are to be thoroughly mixed by trituration.

In using the above-named composition the skin covered with tetter or ringworm should first be washed with moderately-warm water, and then dried without friction with a soft towel, and with the finger slightly anoint the surface covered with the disease once a day. If the surface covered with the disease is tender, apply ointment every other day.

By the use of the above composition the fungous growth of tetter, ringworm, and other cutaneous diseases is entirely destroyed.

I am aware that both thymol and chrysophanic acid have been used for cutaneous diseases; but I am not aware that they have been used in combination or in the proportions stated.

What I claim, and desire to secure by Letters Patent of the United States, is—

The herein-described composition of matter, to be used for the cure of tetter, ringworm, and other cutaneous diseases, consisting of permanganate potassium, thymol, chrysophanic acid, cosmoline, and water, in the proportions specified.

SYDNEY B. LEONARDY.

Witnesses:
J. B. WALL,
E. NEVE.